(12) United States Patent
Lembke

(10) Patent No.: US 9,125,382 B1
(45) Date of Patent: Sep. 8, 2015

(54) BIRD FEEDER WITH SEED RESERVOIR

(76) Inventor: Nathan Lembke, Bentonville, AK (US)

(*) Notice: Subject to any disclaimer, the term of this patent is extended or adjusted under 35 U.S.C. 154(b) by 462 days.

(21) Appl. No.: 13/469,420

(22) Filed: May 11, 2012

Related U.S. Application Data

(63) Continuation-in-part of application No. 12/660,771, filed on Mar. 4, 2010, now abandoned.

(60) Provisional application No. 61/157,979, filed on Mar. 6, 2009.

(51) Int. Cl.
*A01K 39/00* (2006.01)
*A01K 39/014* (2006.01)

(52) U.S. Cl.
CPC .................. *A01K 39/014* (2013.01)

(58) Field of Classification Search
CPC ......... A01K 5/00; A01K 5/01; A01K 5/0114; A01K 5/0275; A01K 5/0283; A01K 39/00; A01K 39/0113; A01K 39/012; A01K 39/014
USPC ............ 119/51.01, 52.2, 52.3, 52.4, 53, 53.5, 119/57.1, 57.9
IPC .............................. A01K 1/10, 5/01, 5/02, 39/00
See application file for complete search history.

(56) References Cited

U.S. PATENT DOCUMENTS

| | | | | |
|---|---|---|---|---|
| 54,005 A * | 4/1866 | Moore | ............................ | 119/60 |
| 763,951 A * | 7/1904 | Bethea | ......................... | 119/61.3 |
| 1,090,286 A * | 3/1914 | Crowell | ........................ | 119/60 |
| 1,558,316 A * | 10/1925 | Tipple | ........................ | 119/57.8 |
| 4,144,842 A | 3/1979 | Schlising | ....................... | 119/52 |
| 5,199,382 A | 4/1993 | Adriano | ......................... | 119/57.4 |
| 5,215,040 A | 6/1993 | Lemley | ........................ | 119/57.9 |
| 5,479,880 A | 1/1996 | Stuhr et al. | .................... | 119/57.8 |
| 5,826,539 A | 10/1998 | Bloedorn | ..................... | 119/52.2 |
| 5,894,813 A | 4/1999 | George | ......................... | 119/57.9 |
| 5,957,087 A | 9/1999 | Bonder et al. | ................ | 119/429 |
| 6,397,779 B1 | 6/2002 | Bonne | ........................ | 119/51.01 |
| 6,431,117 B1 * | 8/2002 | Rauch | ............................ | 119/58 |
| 6,450,120 B1 * | 9/2002 | Nylen | ........................... | 119/52.2 |
| 6,481,375 B1 | 11/2002 | Scalf | ............................. | 19/52.2 |
| 6,889,629 B2 * | 5/2005 | Swift et al. | .................... | 119/52.2 |
| 7,234,416 B2 | 6/2007 | Hoff | .............................. | 119/57.9 |
| 7,263,950 B2 | 9/2007 | Swift et al. | .................... | 119/57.8 |
| 7,753,000 B1 * | 7/2010 | Turner | ......................... | 119/61.2 |
| 2006/0118055 A1 | 6/2006 | Kuelbs | ......................... | 119/57.8 |
| 2006/0162665 A1 | 7/2006 | George | ......................... | 119/52.3 |
| 2006/0288944 A1 | 12/2006 | Hoff | .............................. | 119/57.9 |

* cited by examiner

*Primary Examiner* — David Parsley
*Assistant Examiner* — Thien Thanh Pham
(74) *Attorney, Agent, or Firm* — Woods Oviatt Gilman LLP; Katherine H. McGuire, Esq.

(57) ABSTRACT

The present invention relates to a bird feeder having a bottom structure, a roof structure, and a side support structure extending between the bottom and roof structures.

5 Claims, 3 Drawing Sheets

BIRD FEEDER WITH SEED RESERVOIR

CROSS-REFERENCE TO RELATED APPLICATIONS

This application claims priority to and is a continuation-in-part to U.S. patent application Ser. No. 12/660,771 filed on Mar. 4, 2010 now abandoned which claims priority to and is a continuation-in-part to U.S. provisional patent application Ser. No. 61/157,979 filed on Mar. 6, 2009, the entirety of both is hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to the field of bird feeders in general. In particular, the present invention relates specifically to platform feeders.

2. Description of the Known Art

Bird feeders have for many years been popular with many people including bird watchers, homeowners, and people in general that have a love for birds. There are, of course, many different types of bird feeders. One type of bird feeder that is quite common is the platform type. These bird feeders generally include a shallow feed area with fixed sides that receives and holds feed. While these bird feeders do attract birds and provide an effective setting for watching birds, they typically have one major drawback or shortcoming. The storage area for food is typically small, requiring refilling of the feeder often. Another popular bird feeder is a gravity-fed feeder with a central reservoir above the feeding platform. These bird feeders allow a bird watcher to provide plenty of feed without refilling the reservoir often, but the placement of the reservoir tends to obstruct the view of the feeding birds.

Details of birdfeeders are contained in U.S. Pat. No. 4,144,842 to Schlising on Mar. 20, 1979; U.S. Pat. No. 5,215,040 issued to Lemley on Jun. 1, 1993; U.S. Pat. No. 5,479,880 issued to Stuhr, et al. on Jan. 2, 1996; U.S. Pat. No. 5,826,539 issued to Bloedorn on Oct. 27, 1998; U.S. Pat. No. 5,957,087 issued to Bonder et al. on Sep. 28, 1999; U.S. Pat. No. 6,397,779 issued to Bonne on Jun. 4, 2002; U.S. Pat. No. 6,481,375 issued to Scalf on Nov. 19, 2002. Each of these patents is hereby expressly incorporated by reference in their entirety.

U.S. Pat. No. 4,144,842 to Schlising on Mar. 20, 1979 entitled Access Limiting Bird Feeder teaches a device whereby entry into the feed pan area of a bird feeder is limited to birds of a desired maximum size by means of adjusting the distance between a protective hood and the rim of a feed pan of the bird feeder. Access to the feed area is further limited by making the feed column of the feeder of such a height as to deny squirrels and other marauders a gripping purchase on the top of the feeder while they attempt to reach around the protective hood. In the preferred bird feeder a cylindrical feed column dispenses feed into a pan fixed relative to the bottom of the feed column. An adjustable height conical hood is positioned over the feed pan. Access to the feed in the feed pan is gained by birds passing between the rim of the feed pan and the hood. The maximum size of the bird which may gain access to the feed pan is determined by the distance set between the rim of the feed pan and the hood.

U.S. Pat. No. 5,215,040 issued to Lemley on Jun. 1, 1993 entitled Bird Feeder System for Attracting Multiple Bird Species teaches a bird feeder system for attracting and feeding a variety of species of birds at the same time, the bird feeder including an elongated support to which at least two bird feeders are attached. A spacing member keeps adjacent bird feeders at a predetermined fixed distance apart. The predetermined distance is selected so that incompatible species of birds can feed concurrently at adjacent feeders. In addition, the elongated support is configured for preventing non-bird species, such as rodents, from gaining access to the bird feed in the feeders.

U.S. Pat. No. 5,479,880 issued to Stuhr, et al. on Jan. 2, 1996 entitled Water filtering Open Tray Bird Feeder teaches a feeder for supporting birdseed and permitting rain water to filter through the birdseed. The inventive device includes a support assembly for piercing and engaging a ground surface. A filtering assembly is coupled to an upper distal end of the support assembly and is operable to receive and support birdseed for consumption by a bird. The filtering assembly includes a mesh support screen which permits draining of rain water from the seed.

U.S. Pat. No. 5,826,539 issued to Bloedorn on Oct. 27, 1998 entitled Expanded Mesh Bird Feeder teaches bird feeders of various shapes formed at least partially of an expanded steel mesh material. The mesh is formed from thin sheet metal which is slit, expanded and formed into a portion of a bird feeder body.

U.S. Pat. No. 5,957,087 issued to Bonder et al. on Sep. 28, 1999 entitled Bird feeder with a Removable Feed Drawer teaches a bird feeder having a bottom structure, a roof structure, and a side support structure extending between the bottom and roof structures. Disposed within the bird feeder is a sliding feed drawer. The sliding feed drawer normally assumes a position within the bird feeder. However the entire feed drawer can be removed from the bird feeder for easy and convenient cleaning.

U.S. Pat. No. 6,397,779 issued to Bonne on Jun. 4, 2002 entitled Fly-through Bird Feeder with Autofeeder teaches a uniquely designed truncated prism shaped fly-through bird feeder where birds can fly into and through the bird feeder. The bird feeder frame structure has a bottom and moveable roof structure rotatably attached to side support members between the roof and a base. The bird feeder base further includes a movable floor structure rotatably attached to said frame and a birdseed autofeeder structure. The roof can be raised for easy filling of the truncated prism shaped autofeeder mounted to one side of said frame. The autofeeder is rotatably and removably attached to said frame and can be rotated outwards away from said frame for easy emptying and removal and cleaning of transparent sides. The moveable floor can be rotated outwards and upside down for easy emptying and cleaning.

U.S. Pat. No. 6,481,375 issued to Scalf on Nov. 19, 2002 entitled Repairable Bird Feeder teaches a feeder including a seed platform, a plurality of end panels, a plurality of side panels and a roof structure. In one embodiment, roof panels and chimneys fitted with removable chimney caps form a roof structure for the feeder. Feed may pass through the chimneys and feeder throats before reaching the seed platform. The feeder throats can have access ports that include feed regulators. In one aspect of this embodiment, a bin separator is located bilaterally between at least two of the end panels, the bin separator fixedly secured to two throat keepers and at least one of the side panels. In a further aspect of this embodiment, an anchor block can secure the seed platform and the plurality of feeder throats.

These prior art patents are very limited in their teaching and utilization, and therefore there has and continues to be a need for a bird feeder that includes a seed reservoir that replenishes the birdseed from below the feeding area as it is consumed while still allowing for an unobstructed view of feeding birds.

SUMMARY OF THE INVENTION

The present invention is directed to an improved bird feeding device. Standard bird feeders do not provide unobstructed views to all the birds using the feeder. It is therefore an object of the present invention to provide an unobstructed view of feeding birds. The feeding device includes a covered feeding platform above a birdseed reservoir. The platform is suspended from the feeder cover by cables thereby providing an open platform area for viewing the feeding birds.

It is another object of the invention to provide a bird feeder that replenishes the birdseed from below the feeding area as it is consumed. The reservoir bottom platform is suspended within the seed reservoir, allowing the seed reservoir to move downward as the seed is consumed. The reservoir shifts position downward around the base as the feed is consumed. In this manner, feed is constantly provided to the top of the platform.

It is an object of the invention to provide a new and improved bird feeding device.

It is an object of the invention to provide a bird feeder with a seed reservoir.

Other objects of the invention in part will be obvious and in part will be pointed out hereinafter. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
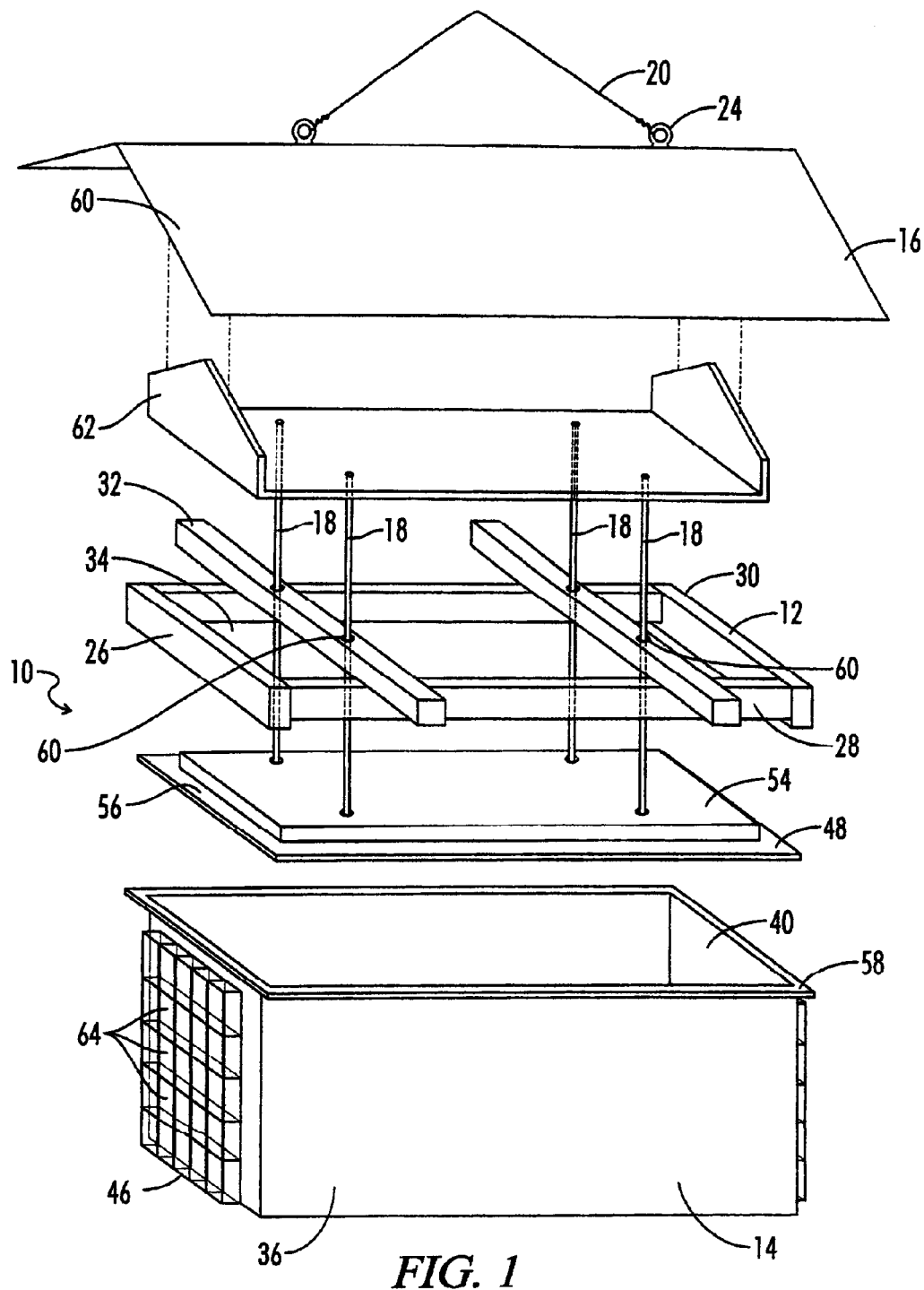
FIG. 1 is exploded view showing my new and improved bird feeder invention.
Figure 2:
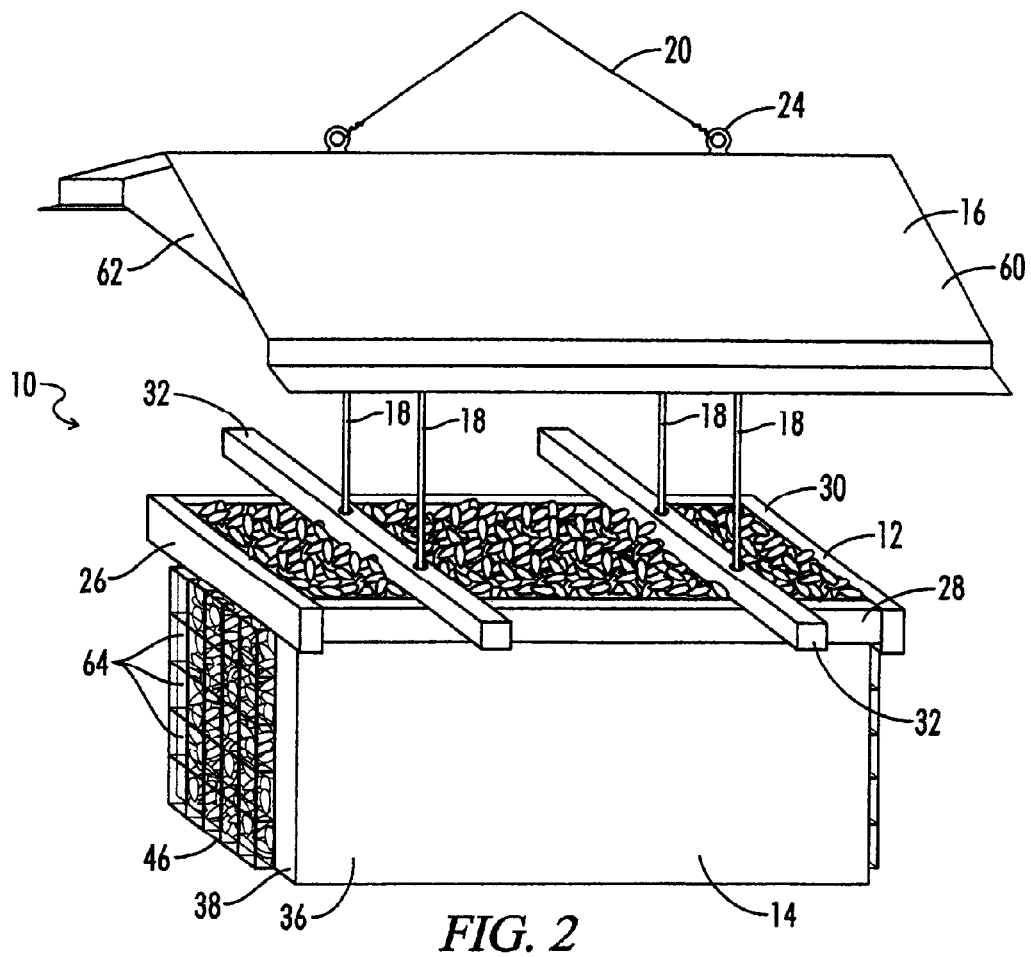
FIG. 2 is a perspective view of the same.

The present invention relates to a platform bird feeder 10 that allows bird watchers an obstructed view of the feeding birds.

The bird feeder 10 generally includes a feeding platform 12, a birdseed receptacle 14, a covering 16 over the platform 12, and suspension cables 18. The platform 12 is suspended from the feeder cover 16 by the cables 18 thereby providing an open platform area for viewing the feeding birds. The bird feeder 10 may also include a hanging cable 20 or a stationary post 22 for either hanging or erecting the bird feeder 10.

Figure 5:
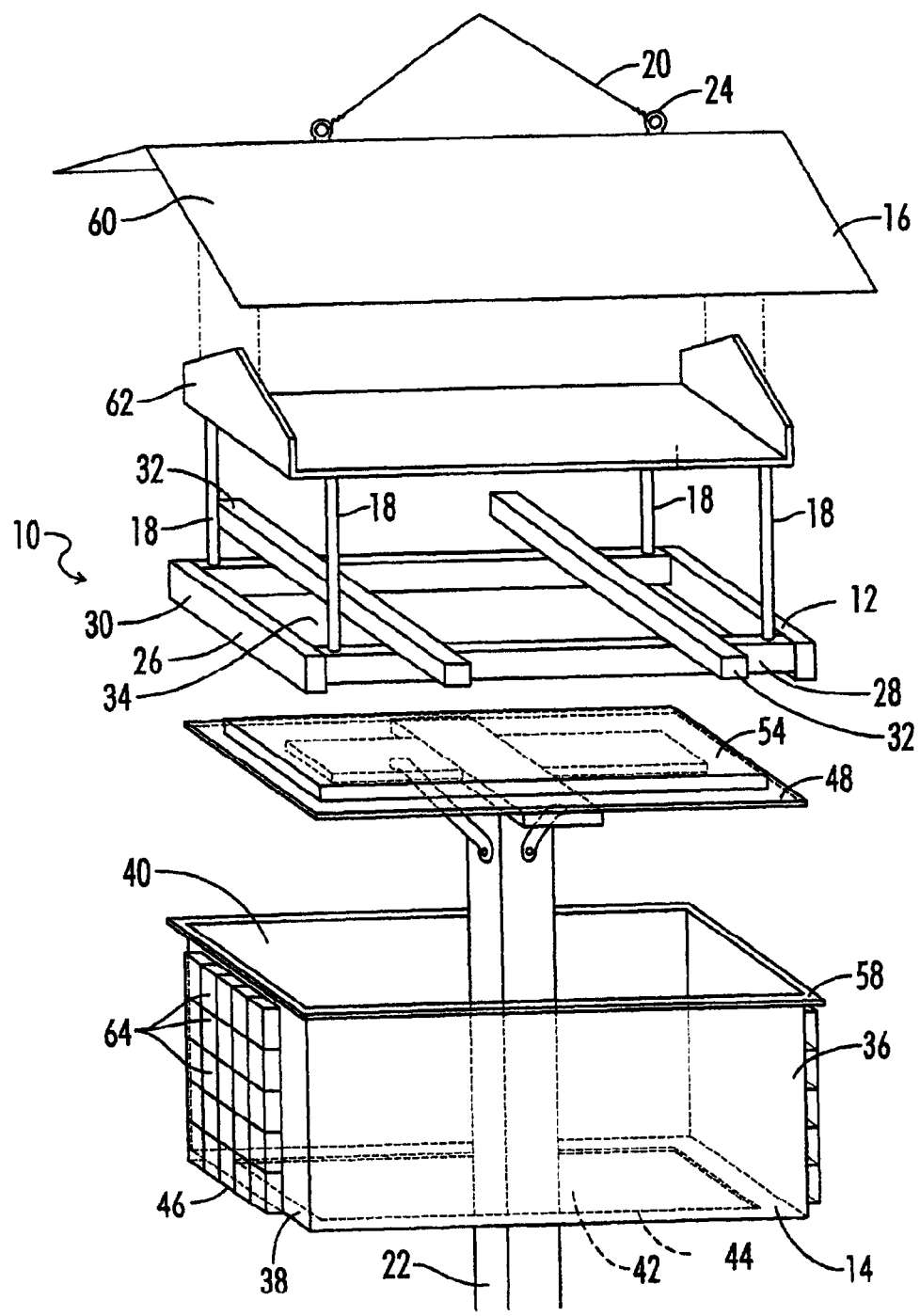
FIG. 5 is exploded view of another embodiment of the bird feeder invention.

Birdseed is held within the birdseed receptacle 14. The birdseed receptacle 14 is a generally rectangular structure with two opposing side walls 36 extending longitudinally and two opposing sides 38 perpendicular to the longitudinal side walls 36. The shorter, perpendicular sides 38 may include a basket 46 secured to the sides 38 with the basket 46 being large enough to allow a suet feeder block to be placed on the side 38 of the receptacle 14. The basket 46 has openings 64 providing access to the suet. The base 42 of the receptacle 14 can be open, as shown in FIG. 5, or closed (not shown). As shown in FIG. 5, the open base 42 of the receptacle 14 includes a lip 44 parallel to the base along the exterior of the receptacle 14. The top 40 of receptacle is open to the platform 12 above. The receptacle 14 may be composed of any hard, supportive material known in the art, including but not limited to wood, metal, and plastic.

Figure 3:
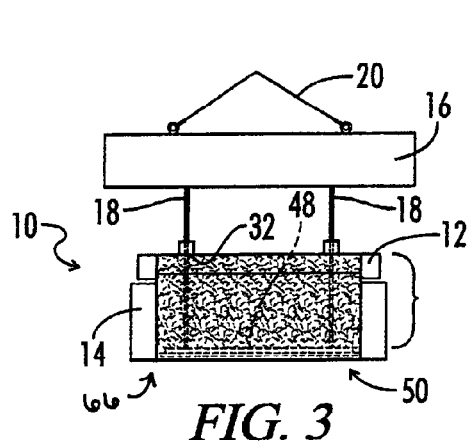
FIG. 3 is a front side view of the same showing the reservoir base in the extended position.
Figure 4:
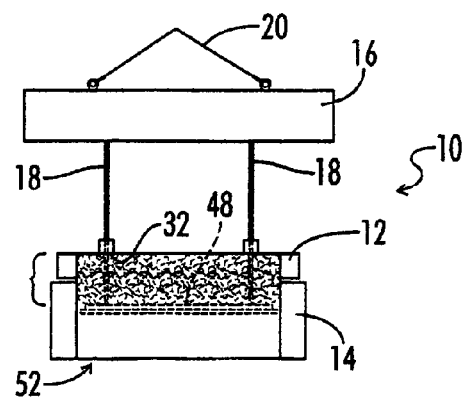
FIG. 4 is a front side view of the same showing the reservoir base in a raised position.

The birdseed held within the receptacle 14 rests upon a suspended platform 48. The suspended platform 48 combined with the receptacle 14 side walls 36, 38 forms the food reservoir 66. The suspended platform 48 is a planar structure with two opposing edges extending longitudinally and two opposing edges perpendicular to the longitudinal edges. The suspended platform 48 fits snugly inside the receptacle 14, but is able to move freely up and down within the receptacle 14 as the birdseed is depleted. As discussed more below, the receptacle 14 moves around the suspended platform 48, moving from a first loaded position 50 (shown in FIG. 3) when the reservoir 66 is full of birdseed to partially loaded positions 52 (shown in FIG. 4) when the reservoir 66 is partially full of birdseed to an final position (not shown) at the top 40 of the receptacle 14 when the birdseed has been emptied from the reservoir 66. The suspended platform 48 may additionally include a raised level 54 in the center of the top face 56 of the platform 48. The raised level 54 does not extend the entire length or width of the platform 48, allowing any liquid that may get into the receptacle 14 to drain away quickly from the birdseed. The raised level 54 additionally lifts the birdseed higher within the feeding platform 12. The suspended platform 48 and its raised level 54 may be composed of any hard, supportive material known in the art, including but not limited to wood, metal, and plastic. The edges of the platform 48 may be covered with a felt, plastic, or similar material adapted to permit movement of the platform 48 within the receptacle 14.

As shown in FIG. 1-5, the suspended platform 48 is suspended from the feeder cover 16 by cables 18 affixed to the top face 56 of the platform 48 or through the suspended platform 48 at the bottom end of the cables 18. The cables 18 are of equal length so as to maintain a level platform and may be comprised of rope, wire, or any sturdy supportive material known in the art. The length of the cables 18 is determined by the desired clearance for the feeding birds between the feeding platform 12 and the covering 16 of the birdfeeder 10. The top end of the cables 18 may be connected to the covering 16 or connected to hook for hanging the birdfeeder 10.

A feeding platform 12 providing a perching area for birds is attached to the top 40 of the open receptacle 14. The feeding platform 12 is generally a rectangular outline 26 with two opposing sides 28 extending longitudinally and two opposing sides 30 perpendicular to the longitudinal sides 28. Within the center of the rectangular outline 26 is an interior space 34 directly above the receptacle 14 allowing the birdseed in the receptacle 14 to be exposed to the platform 12. The feeding platform 12 fits snugly over and extends from the exterior lip 58 of the top 40 of the receptacle. This extension of the feeding platform 12 acts as a seed stop, maintaining the birdseed within the receptacle 14 at a level that is approximately even with the top of the feeding platform 12 so that birds have easy access to the birdseed. Two perches or spans 32 extend across the top of and outwards from the platform 12 perpendicular to the longitudinal sides 28. The spans 32 provide a space for birds or animals to land and rest while eating while also maintaining the birdseed within the receptacle 14. Each span 32 includes two cable apertures 60 allowing the cables 18 suspending the suspended platform 48 to extend through the spans 32. In this manner, the cables 18 are reinforced by the spans 32. The spans 32 and platform 12 may be composed of any hard, supportive material known in the art, including but not limited to wood, metal, and plastic. The feeding platform 12 may additionally include fabric, plastic or any other material around the edges of the platform 12 that may reduce seed leakage and/or improve the movement of the feeding platform 12 on the birdseed.

As mentioned above, the suspended platform 48 is able to move within the receptacle 14 to constantly provide birdseed to the top 40 of the receptacle 14. However, while the suspended platform 48 is able to move within the receptacle 14, the movement of the platform 48 is caused by the receptacle 14 moving around the platform 48. The platform 48 is held at a constant distance from the covering 16, based upon the length of the cables 18. When the receptacle 14 has a reservoir 66 full of birdseed, the feeding platform 12 rests upon the birdseed. In this manner, the feeding platform 12 is placed towards the top of the birdfeeder 10. As the birdseed is consumed and the reservoir 66 decreases, the feeding platform 12 settles on the new top of the birdseed and falls down. Since the receptacle 14 is connected to the feeding platform 12, the receptacle 14 moves downward around the suspended platform 48.

As shown in the drawings, the feeder cover 16 is an elongated structure covering the platform 12. In this manner, bird seed is protected from condensation. The cover 16 can be composed on wood, metal or plastic in virtually any shape, so long as the platform 12 remains covered. Hanging cables 20 are connected to the cover 16 by one or more hooks 24. The hanging cable 20 may be comprised of rope, wire, or any sturdy supportive material known in the art. The cover 16 can be a unitary structure or a compound structure with an angled roof 60 and a ceiling structure 62.

It is envisioned that the overall size, shape, and height of the feeder 10 could be altered to accommodate larger birds or animals while maintaining the replenishing function of the current invention.

The birdfeeder 10 is filled by placing the birdfeeder 10 so that the weight of the receptacle 14 is sitting on the solid surface. The suspended platform 48 is then allowed to slide to the loaded position 50 in the deepest portion of the receptacle 14 sitting on the lip 44 of the receptacle 14. Birdseed is then poured into the open top 40 of the receptacle 14 up to the feeding platform 12. Once the receptacle 14 is filled, the birdfeeder is picked up by the hanging cable 20. The action of picking up the birdfeeder 10 returns the tension to the suspension cables 18 and settles the feeding platform 12 on the top of the birdseed.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. A hanging bird feeder, the feeder comprising:
a) a moveable receptacle, said receptacle comprising at least one wall, a base and a top having a perimeter defining an open area located inwardly of said perimeter;
b) a stationary platform suspended within said receptacle between said base and said top of said moveable receptacle, the receptacle and platform together forming a food reservoir having an exposed top layer of food;
c) a feeding platform secured directly on the perimeter of said top of said moveable receptacle, said feeding platform having an extension extending radially inwardly of said top perimeter and defining an interior space located above the open area of said top perimeter, said feeding platform extension aligned with and always in contact with the exposed top layer of food within said receptacle and thereby forming a food stop preventing food from spilling out of said receptacle, said interior space allowing unobstructed access to the exposed top layer of food deposited into said food reservoir;
d) an elongated covering spaced above and extending over said feeding platform;
e) at least two suspension cables, each of at least two suspension cables having an upper end and a lower end with a fixed length extending therebetween, said upper end secured to said elongated covering and said lower end connected to said stationary platform and extending within said receptacle; and
f) said feeding platform and said moveable receptacle together being movable as a single unit in relation to said stationary platform through the force of gravity as food in said food reservoir is consumed, said extension remaining in contact with the exposed top layer of food as the top layer of food continuously lowers as it is consumed from a first loaded position when said receptacle is full of food which causes said stationary suspended platform to locate proximate said base of said moveable receptacle, to a second empty position, when said receptacle is empty of food which causes said receptacle to move downward relative to said stationary suspended platform whereby said stationary platform locates at a position spaced above and distal from said base of said moveable receptacle.

2. The feeder of claim 1, wherein said feeding platform having at least two spans perpendicular to a longitudinal axis of said feeding platform and resting upon said reservoir.

3. The feeding platform of claim 2, said at least two spans having cable apertures allowing said cables to extend through said at least two spans.

4. The suspended platform of claim 1 further comprising a raised center level and a lower gutter level, said lower gutter level allowing liquid to drain from said reservoir.

5. The feeder of claim 1, said at least two suspension cables composed of a material selected from the following: rope, wire, metal, or nylon.

* * * * *